(12) United States Patent
Truong et al.

(10) Patent No.: US 12,288,193 B2
(45) Date of Patent: *Apr. 29, 2025

(54) SYSTEMS AND METHODS FOR FACILITATING CANDIDATE INTERVIEWS

(71) Applicant: Capital One Services, LLC, McLean, VA (US)

(72) Inventors: Anh Truong, Champaign, IL (US); Kate Key, Powhatan, VA (US); Galen Rafferty, Mahomet, IL (US); Reza Farivar, Champaign, IL (US); Vincent Pham, McLean, VA (US); Austin Walters, Champaign, IL (US); Mark Watson, Sedona, AZ (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/528,895

(22) Filed: Dec. 5, 2023

(65) Prior Publication Data

US 2024/0104505 A1 Mar. 28, 2024

Related U.S. Application Data

(63) Continuation of application No. 17/678,491, filed on Feb. 23, 2022, now Pat. No. 11,875,312, which is a
(Continued)

(51) Int. Cl.
*G06K 9/00* (2022.01)
*G06F 11/362* (2025.01)
(Continued)

(52) U.S. Cl.
CPC ....... *G06Q 10/105* (2013.01); *G06F 11/3624* (2013.01); *G06V 30/148* (2022.01); *G06V 30/414* (2022.01); *G06V 30/10* (2022.01)

(58) Field of Classification Search
None
See application file for complete search history.

(56) References Cited

U.S. PATENT DOCUMENTS 9,712,537 B2 * 7/2017 Gehring ................ G06F 3/0484
10,127,573 B2 * 11/2018 Ye ....................... G06Q 30/0243
(Continued)

FOREIGN PATENT DOCUMENTS

CN 101635104 1/2010
CN 101635104 A * 1/2010
(Continued)

OTHER PUBLICATIONS

Automated Online Exam Proctoring, Yousef Atoum et al., IEEE, 1520-9210, 2017, pp. 1609-1624 (Year: 2017).*
(Continued)

*Primary Examiner* — Jayesh A Patel
(74) *Attorney, Agent, or Firm* — HUNTON ANDREWS KURTH LLP

(57) ABSTRACT

A system for determining candidate answers during an interview. The system may include a memory storing executable instructions, and at least one processor configured to execute the instructions to perform operations. The operations may include capturing, by an image sensor, a plurality of images comprising a plurality of candidate answers; detecting, based on the captured images, a first bounding box comprising the plurality of the candidate answers; detecting, based on the captured images, a second bounding box comprising a plurality of alphanumeric characters, a first one of the alphanumeric characters being located on a line of software code; calculating a distance from a side of a first bounding box to a side of a second bounding box; and determining, based on the calculated distance, a source code alignment.

20 Claims, 6 Drawing Sheets

Related U.S. Application Data continuation of application No. 16/806,501, filed on Mar. 2, 2020, now Pat. No. 11,288,532.

(51) Int. Cl.
  *G06Q 10/105* (2023.01)
  *G06V 30/148* (2022.01)
  *G06V 30/414* (2022.01)
  *G06V 30/10* (2022.01)

(56) References Cited

U.S. PATENT DOCUMENTS

| | | | | |
|---|---|---|---|---|
| 10,755,039 | B2* | 8/2020 | Rodriguez | G06F 40/137 |
| 11,288,532 | B2* | 3/2022 | Truong | G06F 11/3624 |
| 11,875,312 | B2* | 1/2024 | Truong | G06V 30/414 |
| 2005/0283378 | A1* | 12/2005 | Iserson | G06Q 10/1053 |
| | | | | 705/321 |
| 2006/0218031 | A1* | 9/2006 | Weinberg | G06Q 30/02 |
| | | | | 705/7.32 |
| 2008/0065471 | A1* | 3/2008 | Reynolds | G06Q 30/0201 |
| | | | | 705/7.32 |
| 2010/0114791 | A1* | 5/2010 | Gold | G06Q 10/10 |
| | | | | 705/347 |
| 2011/0047087 | A1* | 2/2011 | Young | G06Q 10/06 |
| | | | | 705/317 |
| 2012/0243785 | A1* | 9/2012 | Yu | G06V 30/1473 |
| | | | | 382/173 |
| 2013/0226578 | A1* | 8/2013 | Bolton | G10L 15/22 |
| | | | | 704/235 |
| 2016/0026899 | A1* | 1/2016 | Wang | G06F 18/2163 |
| | | | | 382/176 |
| 2016/0028736 | A1* | 1/2016 | Gehring | H04W 12/08 |
| | | | | 726/4 |
| 2018/0357916 | A1* | 12/2018 | Breed | G06V 40/19 |
| 2020/0151444 | A1* | 5/2020 | Price | G06V 30/416 |
| 2020/0311682 | A1* | 10/2020 | Olshansky | G06V 20/40 |
| 2021/0110189 | A1* | 4/2021 | Huang | G06F 18/217 |

FOREIGN PATENT DOCUMENTS

| | | | | |
|---|---|---|---|---|
| CN | 109409234 | | 3/2019 | |
| CN | 109409234 A | * | 3/2019 | G06F 3/03545 |

OTHER PUBLICATIONS

Automated Online Exam Proctoring, Yousel Atoum et al., IEEE, 1520-9210, 2017, pp. 1609-1624 (Year: 2017).

* cited by examiner

400

Correct Answer

Please store answer and proceed to new question

402

Incorrect Answer

Please discard answer and proceed to new answer

404

SYSTEMS AND METHODS FOR FACILITATING CANDIDATE INTERVIEWS

CROSS-REFERENCE TO RELATED APPLICATION

This application is a continuation of U.S. patent application Ser. No. 17/678,491 filed Feb. 23, 2022, now U.S. Pat. No. 11,875,312, which is a continuation of U.S. patent application Ser. No. 16/806,501 filed Mar. 2, 2020, now U.S. Pat. No. 11,288,532, the complete disclosures of which are incorporated herein by reference in their entireties.

TECHNICAL FIELD

The present disclosure relates generally to systems and methods for interpreting candidate answers to facilitate an in-person interview process, and more particularly, for automatically detecting spacing errors or bugs in the source code of handwritten candidate answers during the course of an interview.

BACKGROUND

In many settings, employers may offer interviews having a plurality of interview questions that require handwritten or typed candidate answers. As an example, a handwritten answer may be written on a whiteboard or a blackboard, and a typed answer may be typed on a keyboard. Interview questions may test an interview candidate's aptitude in different types of source code or programming language and the candidate answers may be presented in a source code format. Multiple interviews may be conducted by a single interviewer during the course of one day or a plurality of consecutive days. Often times, interviewers experience fatigue from conducting many interviews during a single day and/or become distracted from conducting interviews due to the demands of their regular workload. Other times, interviewers may not be able to concentrate on the source code of the candidates interview response answers when reviewing handwritten or typed candidate answers to interview. As a result, interviewers may make a mistake on an evaluation of a candidate answer. In particular, interviewers may overlook spacing irregularities, use of incorrect syntax or variables, and/or fail to detect other errors in evaluating the source code answers provided by interview candidates.

Accordingly, what is needed is a system that facilitates the interview process by detecting spacing errors, bugs, or source code alignment in the source code candidate answers that an interviewer might have missed when conducting a manual review of candidate answers. Additionally, what is needed is a system that provides interviewers more time to evaluate and assess the logic and thought processes expressed in the candidate answers, instead of burdening the interviewers by requiring the interviewers to evaluate details of the syntax and/or spacing of the candidate source code answers. Moreover, what is needed are techniques that provide to interviewers suggestions of source code questions to the interviewers in cases where interviewers are required to candidates with respect to specific programming languages unfamiliar to the interviewers.

Furthermore, what is needed are image analysis techniques that capture handwritten candidate answers in real-time and that perform image analysis classification techniques to compare incorrect answers with correct answers. Additionally, what is needed are techniques based on image analysis for automatic detection of source code alignment and spacing across a plurality of lines of the source code, and techniques for comparison of a candidate answers to candidate solutions previously stored in a database. Finally, what is needed are notification and transmission means for interview questions and answer results to be communicated to a plurality of interviewers at a user interface.

The disclosed systems and methods address one or more of the problems set forth above and/or other problems in the prior art.

SUMMARY

One aspect of the present disclosure is directed to a system for determining candidate answers during an interview. The system may include a memory storing executable instructions, and at least one processor configured to execute the instructions to perform operations. The operations may include capturing, by an image sensor, a plurality of images comprising a plurality of candidate answers; detecting, based on the captured images, a first bounding box comprising the candidate answers; detecting, based on the captured images, a second bounding box comprising a plurality of alphanumeric characters, a first one of the characters being located on a line of software code; calculating a distance from a side of the first bounding box to a side of the second bounding box; and determining, based on the calculated distance, a software code alignment.

Another aspect of the present disclosure is directed to a method for determining candidate answers during an interview. The method may include capturing, by an image sensor, a plurality of images comprising a plurality of candidate answers; detecting, based on the captured images, a first bounding box comprising the candidate answers; detecting, based on the captured images, a second bounding box comprising a plurality of alphanumeric characters, a first one of the characters being located on a line of software code; calculating a distance from a side of the first bounding box to a side of the second bounding box; and determining, based on the calculated distance, a software code alignment.

Yet another aspect of the present disclosure is directed to a non-transitory computer-readable medium storing instructions that, when executed by a processor, cause the processor to perform operations for determining candidate answers during an interview. The operations may include capturing, by an image sensor, a plurality of images comprising a plurality of candidate answers; detecting, based on the captured images, a first bounding box comprising the candidate answers; detecting, based on the captured images, a second bounding box comprising a plurality of alphanumeric characters, a first one of the characters being located on a line of software code; calculating a distance from a side of the first bounding box to a side of the second bounding box; and determining, based on the calculated distance, a software code alignment.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
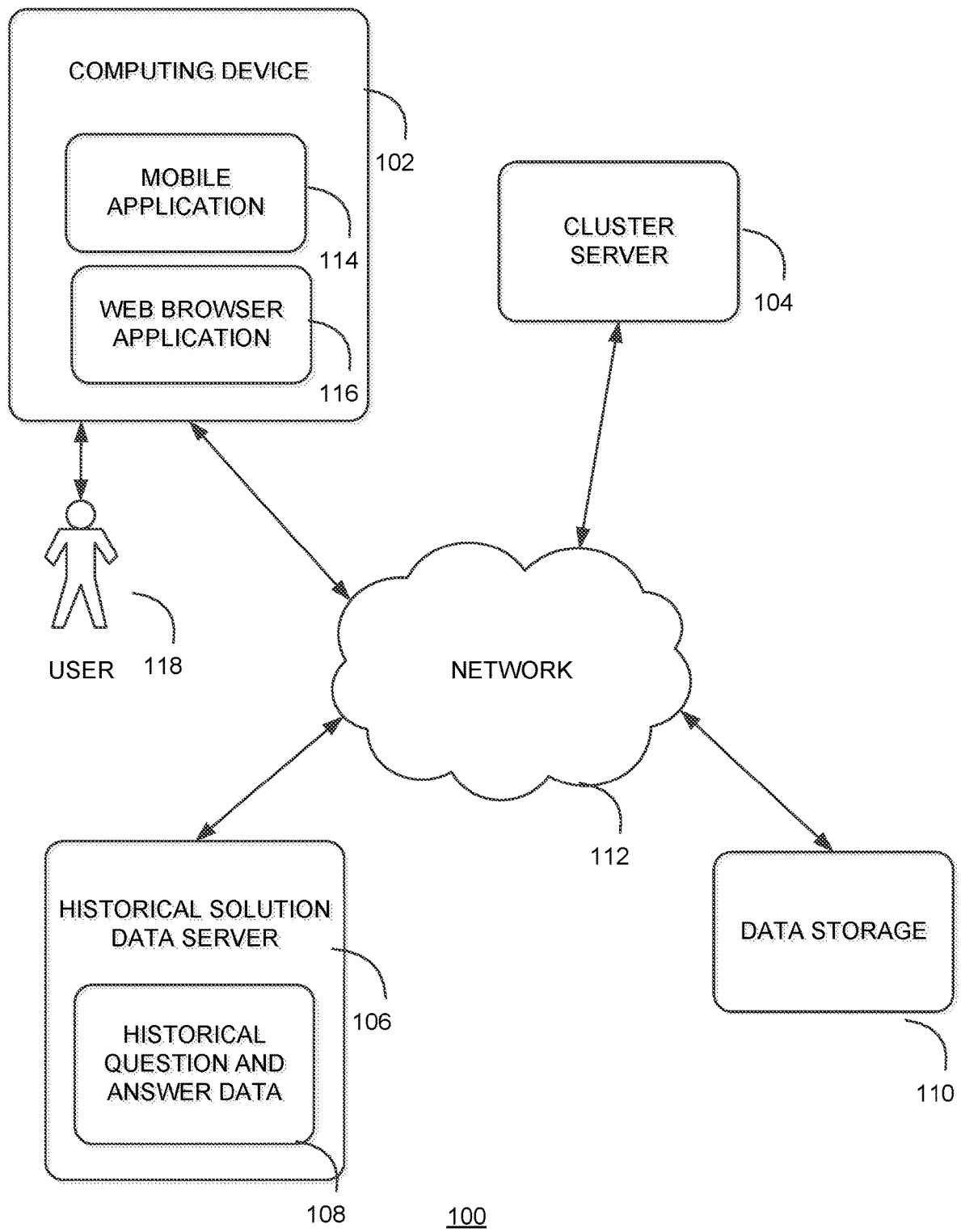
FIG. 1 is a block diagram of an exemplary system, consistent with disclosed embodiments.

Reference will now be made in detail to the disclosed embodiments, examples of which are illustrated in the accompanying drawings.

The disclosed systems, methods, and media leverage cluster-based historical data. Historical data may include question-and-answer data associated with a number of users and, for each user, a number of attributes exhibited by the user during a period of time. A "user" may be defined as an interview examiner (or interviewer) and/or an interview candidate (or interviewee), and a "period of time" or "time period" may be defined as a time interval for a single interview and/or a time interval spanning a plurality of interviews. Historical data may further include question-and-answer data associated with a plurality of interviewers and/or interviewees and may also include changes to question-and-answer datasets during particular periods of time.

A "cluster" may be defined as a subset of historical data describing a subset of users included in the historical data, where the user subset is defined on the basis of the user, attributes, and/or a time period associated with the historical data. That is, a cluster may include historical data associated with only a subset of users exhibiting a certain attribute or attributes during a time period. For example, for historical data indicating question-and-answer data associated with a plurality of interview candidates, a cluster may include historical data relating to only a subset of interviewers or interview candidates who have interviewed during a particular time period. Historical data relating to other users or other time periods may not be included in the cluster.

Historical data may be organized into any number of clusters. In some cases, historical data associated with a given user may be included in only a single cluster. Alternatively, historical data associated with a given user may be included in multiple clusters. Historical data organized into clusters may be stored in data storage.

The cluster-based historical data may be used to generate recommendations for future behavior that can help a user achieve a desired outcome. A "recommendation" may be defined as data indicating attributes that will assist a user in achieving a desired outcome and/or attributes that will hinder a user in achieving a desired outcome. For instance, a "recommendation" may include an interview question or an interview answer. An interview question or an interview answer may be generated based upon historical question-and-answer data associated with users in the past. In some embodiments, an interview question or an interview answer may indicate or inform interviewers with respect to future questions, answers, and/or programming languages. These "recommendations" may assist an interviewer in deciding on future interview questions and/or attributes that will assist an interviewer in developing new questions.

Unlike recommendations based on historical data in typical data storage, recommendations generated based on cluster-based historical data may be tailored on the basis of users, attributes, and/or time periods covered by the historical data. For example, recommendations generated based on cluster-based historical data may identify clusters describing a subset of users exhibiting a certain attribute or attributes during a time period, and may be based only on the subset of users. As a result, recommendations generated based on cluster-based historical data can provide improved insights into how future behavior will affect outcomes.

FIG. 1 is a block diagram of an exemplary system 100, consistent with disclosed embodiments. System 100 may be configured for performing a cluster process consistent with disclosed embodiments.

As shown, system 100 may include a computing device 102, a cluster server 104, a historical solution data server 106 that includes historical question-and-data 108, and data storage 110. As shown, computing device 102, cluster server 104, historical solution data server 106, and data storage 110 may be communicatively coupled by a network 112.

While only one computing device 102, cluster server 104, historical solution data server 106, data storage 110, and network 112 are shown, it will be understood that system 100 may include more than one of any of these components. More generally, the components and arrangement of the components included in system 100 may vary. Thus, system 100 may include other components that perform or assist in the performance of one or more processes consistent with the disclosed embodiments.

Computing device 102 may comprise one or more computing devices, such as mobile devices, laptops, or tablets configured to perform operations consistent with requesting a recommendation from cluster server 104. The recommendation may include an interview question, stored prior interview answer, source code, instructions, or data (or information in support of such source code, instructions, or data) for achieving a goal or performing an operation. For example, the recommendation may be a recommendation for providing an interview question in a desired programming language. As another example, the recommendation may be a recommendation for selecting one or more image sensors for capturing still images and/or video feeds of handwritten or typed candidate answers. More generally, the recommendation may include any instruction of future actions related to an interview process based on historical actions of multiple users, including, for example, multiple interviewers and interview candidates. Computing device 102 may be further configured to receive the recommendation from cluster server 104.

In some embodiments, computing device 102 may include a mobile application 114 and/or a web browser application 116. Mobile application 114 may be one or more software applications configured to perform operations consistent with communicating with cluster server 104. Web browser application 116 may be one or more software applications configured to perform operations consistent with providing web pages, such as web pages associated with cluster server 104, and communicating with cluster server 104. Computing device 102 may be associated with a user 118. User 118 may be an individual, an entity, and/or an interviewing corporation associated with the individual or entity. As an example, a user may be an interviewing corporation or an interviewing representative of the interviewing corporation. User 118 may request and/or receive the recommendation from cluster server 104 through mobile application 114 and/or through a web page provided through web browser application 116. Computing device 102 is further described below in connection with FIG. 3.

Cluster server 104 may be one or more computing devices configured to perform operations consistent with generating clusters based on historical question-and-answer data 108.

In some embodiments, cluster server 104 may be configured to access historical question-and-answer data 108 at historical solution data server 106. Alternatively or additionally, in some embodiments some or all of historical question-and-answer data 108 may be maintained elsewhere, such as at cluster server 104, in data storage 110, and/or in another entity in network 112 and/or system 100. In some embodiments, cluster server 104 may be further configured to generate, based on historical question-and-answer data 108, a number of clusters. In some embodiments, cluster server 104 may store the generated clusters in data storage 110. Alternatively, or additionally, in some embodiments some or all of the generated clusters may be stored elsewhere, such as at cluster server 104, at historical solution data server 106, and/or in another entity in network 112 and/or system 100.

Cluster server 104 may be further configured to perform operations consistent with providing a recommendation to computing device 102. In some embodiments, cluster server 104 may receive a request for the recommendation from computing device 102. Cluster server 104 may be configured to select a cluster for user 118 and, based on the selected cluster, determine the recommendation. Cluster server 104 may provide the recommendation to computing device 102.

Historical solution data server 106 may be one or more computing devices configured to maintain historical question-and-answer data 108. Historical question-and-answer data 108 may include data associated with a number of users and, for each user, a number of attributes exhibited by the user during a period of time. Historical question-and-answer data 108 may also include, for each user, questions the interviewer user has asked over a time period and changes to the interviewer's questions during the time period.

In some embodiments, historical solution data server 106 may aggregate historical question-and-answer data from one or more sources, such as one or more servers in network 112 and/or system 100. Alternatively, or additionally, historical solution data server 106 may be included in and/or otherwise associated with one or more such sources. In some embodiments, historical solution server 106 may aggregate data from, may be included in, and/or may be otherwise associated with a computer software company that provides, maintains, manages, or otherwise offers interview questions. For example, the computer software company may be a telecommunications company, software company, search engine company, social media company, and/or any type of company that generates, provides, manages, and/or maintains interview questions and candidate answers for dissemination and further analysis. Historical solution data server 106 may aggregate data from, may be included in, and/or may be otherwise associated with other entities in network 112 and/or system 100 as well. While historical solution data server 106 is shown separately, in some embodiments historical solution data server 106 may be included in and/or otherwise associated with cluster server 104, data storage 110, and/or another entity in network 112 and/or system 100.

Data storage 110 may include one or more memory devices that store information and are accessed and/or managed through cluster server 104. By way of example, data storage 110 may include one or more database(s), such as Oracle™ databases, Sybase™ databases, or other relational databases or non-relational databases, such as Hadoop sequence files, HBase, or Cassandra. Such database(s) may include computing components (e.g., database management system, database server, etc.) configured to receive and process requests for data stored in memory devices of the database(s) and to provide data from the database(s). Alternatively or additionally, data storage 110 may include cloud-based storage accessible by cluster server 104 over network 112 and/or another network. Clusters generated at cluster server 104 may be stored in data storage 110 as, for example, an instance or an object, such as a Java object, accessible by cluster server 104. While data storage 110 is shown separately, in some embodiments data storage 110 may be included in and/or otherwise associated with cluster server 104, historical solution data server 106, and/or another entity in network 112 and/or system 100.

Network 112 may be any type of network configured to provide communication between components of system 100. For example, network 112 may be any type of network (including infrastructure) that provides communications, exchanges information, and/or facilitates the exchange of information, such as the Internet, a Local Area Network, near field communication (NFC) system, or other suitable connection(s) that enable the sending and receiving of information between the components of system 100. In other embodiments, one or more components of system 100 may communicate directly through a dedicated communication link(s).

It is to be understood that the configuration and boundaries of the functional building blocks of system 100 have been defined herein for the convenience of the description. Alternative boundaries may be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
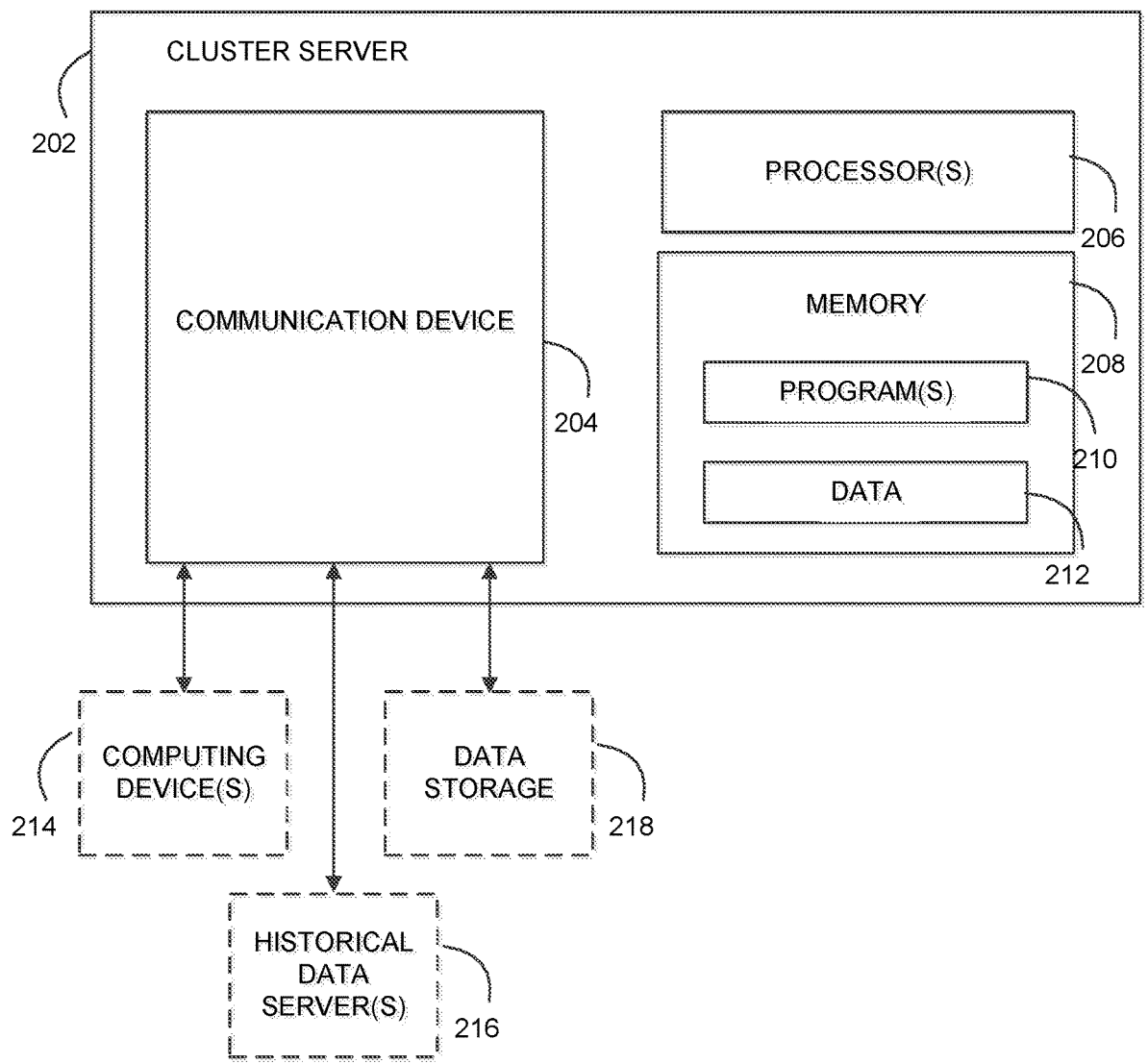
FIG. 2 is a block diagram of an exemplary cluster server, consistent with disclosed embodiments.

FIG. 2 is a block diagram of an exemplary cluster system 200, consistent with disclosed embodiments. As shown, cluster system 200 may include a cluster server 202 which may include a communication device 204, one or more processor(s) 206, and memory 208 including one or more program(s) 210 and data 212. Cluster server 202 may be an example of cluster server 104 as discussed above.

Cluster server 202 may take the form of a server, general purpose computer, mainframe computer, or any combination of these components. Other implementations consistent with disclosed embodiments are possible as well.

Communication device 204 may be configured to communicate with one or more entities. For example, in some embodiments, communication device 204 may be configured to communicate with one or more computing device(s) 214, such as computing device 102 described above. In some embodiments, communication device 204 may be configured to communicate with computing device(s) 214 through a mobile application, such as mobile application 114 described above, and/or through a web page provided by a web browser application, such as web browser application 116 described above. Communication device 204 may also be an example of computing device 102. In particular, in some embodiments, cluster server 202 may be configured to receive from one or more computing device(s) 214 a request for a recommendation and to provide the recommendation to the computing device(s) 214. Communication device 204 may be configured to communicate with the computing device(s) 214 in other manners as well.

Communication device 204 may be further configured to communicate with one or more historical data server(s) 216, such as historical solution data server 106 described above. In some embodiments, cluster server 202 may be configured to access historical data maintained at historical data server(s) 216. Communication device 204 may be configured to communicate with the historical data server(s) 216 in other manners as well.

Communication device 204 may be still further configured to communicate with data storage 218, such as data storage 110 described above. In some embodiments, cluster server 202 may be configured to generate clusters based on historical data accessed at historical data server(s) 216 and store the generated clusters in data storage 218. Communication device 204 may be configured to communicate with data storage 218 in other manners as well.

Communication device 204 may also be configured to communicate with other components. In general, communication device 204 may be configured to provide communication over a network, such as network 112 described above. To this end, communication device 204 may include, for example, one or more digital and/or analog devices that allow cluster server 200 to communicate with and/or detect other components, such as a network controller and/or wireless adaptor for communicating over the Internet. Other implementations consistent with disclosed embodiments are possible as well.

Processor(s) 206 may include one or more known processing devices, such as a microprocessor from the Core™, Pentium™, or Xeon™ family manufactured by Intel™ the Turion™ family manufactured by AMD™ the "Ax" or "Sx" family manufactured by Apple™ or any of various processors manufactured by Sun Microsystems, for example. The disclosed embodiments are not limited to any type of processor(s) otherwise configured to meet the computing demands required of different components of cluster system 200.

Memory 208 may include one or more storage devices configured to store instructions used by processor(s) 206 to perform functions related to disclosed embodiments. For example, memory 208 may be configured with software instructions, such as program(s) 210, that may perform one or more operations when executed by processor(s) 206. The disclosed embodiments are not limited to separate programs or computers configured to perform dedicated tasks. For example, memory 208 may include a single program 210 that performs the functions of cluster system 200, or program(s) 210 may comprise multiple programs. Memory 208 may also store data 212 that is used by program(s) 210. In some embodiments, for example, data 212 may include historical data and/or generated clusters. Other data 212 is possible as well. For example, in some embodiments, data 212 may include code in a conventional programming language, such as C++, C, Fortran, Pascal, etc. In some implementations, data 212 may include a programming language that supports dynamic typing (e.g., the M language, a MATLAB® language, a MATLAB-compatible language, a MATLAB-like language, Julia, Python, etc.) that can be used to express problems and/or solutions in mathematical notations. Data 212 may be used as source code for sample interview questions and candidate answers.

In certain embodiments, memory 208 may store sets of instructions for carrying out the processes described below in connection with FIG. 6. Other instructions are possible as well. In general, instructions may be executed by processor(s) 206 to perform one or more processes consistent with disclosed embodiments.

The components of cluster system 200 may be implemented in hardware, software, or a combination of both hardware and software, as will be apparent to those skilled in the art. For example, although one or more components of cluster system 200 may be implemented as computer processing instructions, all or a portion of the functionality of cluster system 200 may be implemented instead in dedicated electronic hardware.

Figure 3:
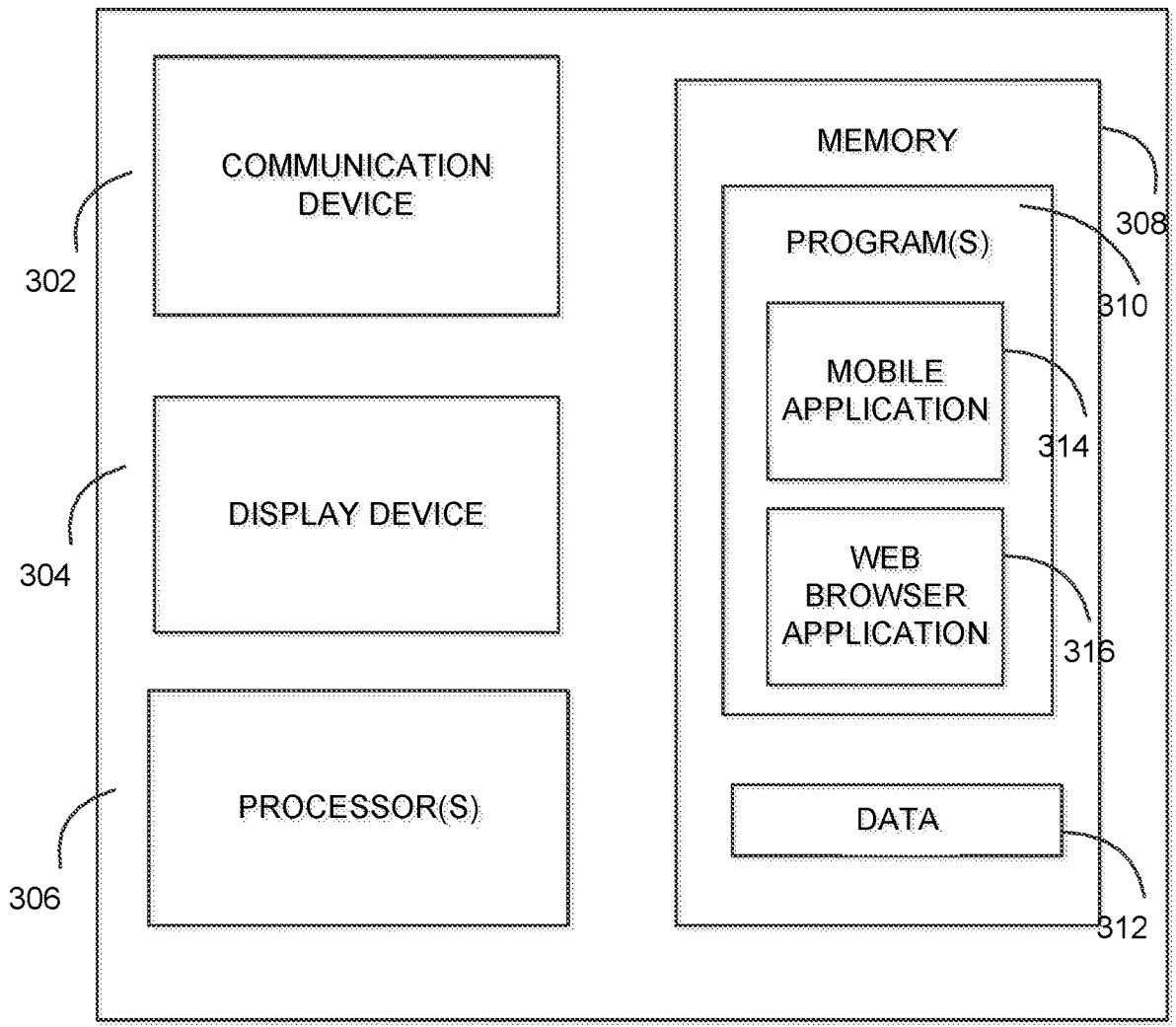
FIG. 3 is a block diagram of an exemplary computing device, consistent with disclosed embodiments.

FIG. 3 is a block diagram of a computing device 300, which is an example of computing device 102, consistent with disclosed embodiments. As shown, computing device 300 may include a communication device 302, a display device 304, processor(s) 306, and memory 308 including program(s) 310 and data 312. Program(s) 310 may include, among others, mobile application 314 and web browser application 316 corresponding to mobile application 114 and web browser application 116 (FIG. 1).

In some embodiments, computing device 300 may take the form of a desktop or mobile computing device, such as a desktop computer, laptop computer, smartphone, tablet, or any combination of these components. Alternatively, computing device 300 may be configured as any wearable item, or any other device suitable for carrying on a customer's person. Other implementations consistent with disclosed embodiments are possible as well.

Communication device 302 may be configured to communicate with a cluster server, such as cluster servers 104 and 202 described above. For example, communication device 302 may be configured to request and/or receive a recommendation from the cluster server. Communication device 302 may receive such data through, for example, the mobile application 314 and/or web browser application 316.

Communication device 302 may be configured to provide communication over a network, such as network 112 described above. To this end, communication device 302 may include, for example, one or more digital and/or analog devices that allow computing device 300 to communicate with and/or detect other components, such as a network controller and/or wireless adaptor for communicating over the Internet. Other implementations consistent with disclosed embodiments are possible as well.

Display device 304 may be any display device configured to display interfaces on computing device 300. The interfaces may include, for example, web pages provided by computing device 300 through web browser application 316 and/or interfaces provided by computing device 300 through mobile application 314. In some embodiments, display device 304 may include a screen for displaying a graphical and/or text-based user interface, including but not limited to, liquid crystal displays (LCD), light emitting diode (LED) screens, organic light emitting diode (OLED) screens, and other known display devices. In some embodiments, display device 304 may also include one or more digital and/or analog devices that allow an interviewer or interviewee to interact with computing device 300, such as a touch-sensitive area, keyboard, buttons, or microphones. Other display devices are possible as well. The disclosed embodiments are not limited to any type of display devices otherwise configured to display interfaces.

Processor(s) 306 may include one or more known processing devices, such as a microprocessor from the Core™, Pentium™ or Xeon™ family manufactured by Intel™ the Turion™ family manufactured by AMD™ the "Ax" or "Sx" family manufactured by Apple™ or any of various processors manufactured by Sun Microsystems, for example. Processor(s) 306 may also include various architectures (e.g., x86 processor, ARM®, etc.). The disclosed embodiments are not limited to any type of processor(s) otherwise configured to meet the computing demands required of different components of computing device 300.

Memory 308 may include one or more storage devices configured to store instructions used by processor(s) 306 to perform functions related to disclosed embodiments. For example, memory 308 may be configured with one or more software instructions, such as program(s) 310, that may perform one or more operations when executed by processor(s) 306. The disclosed embodiments are not limited to separate programs or computers configured to perform dedicated tasks. For example, memory 308 may include a single program 310 that performs the functions of computing device 300, or program(s) 310 may comprise multiple programs. Memory 308 may also store data 312 that is used by program(s) 310. Data 312 may include, for example, data associated with computing device(s), such as interview question-and-answer data, and/or with user(s) associated with computing device(s), such as interviewers or interviewees. In some embodiments, data 312 may include code in a conventional programming language, such as C++, C, Fortran, Pascal, etc. In some implementations, data 312 may include a programming language that supports dynamic typing (e.g., the M language, a MATLAB® language, a MATLAB-compatible language, a MATLAB-like language, Julia, Python, etc.) that can be used to express problems and/or solutions in mathematical notations. Data 312 may be used as source code for sample interview questions and candidate answers.

In some embodiments, program(s) 310 may include mobile application 314. Mobile application 314 may be executable by processor(s) 306 to perform operations including, for example, requesting a recommendation from a cluster server, such as cluster servers 104 and 202 described above, and/or receiving the recommendation from the cluster server. The mobile application 314 may be executable by processor(s) 306 to perform other operations as well.

In some embodiments, program(s) 310 may further include web browser application 316. The web browser application 316 may be executable by processor(s) 306 to perform operations including, for example, providing web pages for display. The web pages may be provided, for example, via display device 304. In some embodiments, the web pages may be associated with a cluster server, such as cluster servers 104 and 202 described above. Web browser application 316 may be executable by processor(s) 306 to perform other operations as well.

The components of computing device 300 may be implemented in hardware, software, or a combination of both hardware and software, as will be apparent to those skilled in the art. For example, although one or more components of computing device 300 may be implemented as computer processing instructions, all or a portion of the functionality of computing device 300 may be implemented instead in dedicated electronic hardware.

In some embodiments, computing device 300 may operate as a programming environment. For example, computing device 300 may be capable of receiving, generating, storing, processing, and/or providing program code or information associated with program code (e.g., text, a token, an error, a pattern, etc.). For example, computing device 300 may include a desktop computer, a laptop computer, a tablet computer, a mobile phone (e.g., a smart phone, a radiotelephone, etc.), or a similar device. Computing device 300 may receive input text in a programming language associated with a programming environment. Computing device 300 may process the input text to determine whether the input text is valid. When the input text is invalid, computing device 300 may determine valid program code based on the input text. Computing device 300 may then prompt a user (e.g., via a user interface of a programming environment) regarding the valid program code or may replace the input text with the valid program code. In some implementations, computing device 300 may receive information from and/or transmit information to a cluster server 202.

Computing device 300 may host a programming environment, and may include any hardware-based component or a combination of hardware and software-based components that provides a computing environment that allows interviews to be performed (e.g., by users) related to disciplines, such as, but not limited to, mathematics, science, engineering, medicine, business, etc., more efficiently than if the interviews were performed in another type of computing environment, such as an environment that required the user to develop code in a conventional programming language, such as C++, C, Fortran, Pascal, etc. In some implementations, programming environment may include a programming language that supports dynamic typing (e.g., the M language, a MATLAB® language, a MATLAB-compatible language, a MATLAB-like language, Julia, Python, etc.) that can be used to express problems and/or solutions in mathematical notations.

For example, computing device 300 may use an array as a basic element, where the array may not require dimensioning. These arrays may be used to support array-based programming where an operation may apply to an entire set of values included in the arrays. Array-based programming may allow array-based operations to be treated as high-level programming that may allow, for example, operations to be performed on entire aggregations of data without having to resort to explicit loops of individual non-array operations. In addition, the programming environment of computing device 300 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state-based analysis and/or design, etc.

In some embodiments, computing device 300 may further provide mathematical functions and/or graphical tools (e.g., for creating plots, surfaces, images, volumetric representations, etc.). In some implementations, programs 310 may provide these functions and/or tools using toolboxes (e.g., toolboxes for signal processing, image processing, data plotting, parallel processing, etc.). In some implementations, programs 310 may provide these functions as block sets or in another way, such as via a library, etc.

In some embodiments, computing device 300 may operate a text-based programming environment (e.g., MATLAB software; Octave; Python; Comsol Script; MATRIX from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.), a graphically-based programming environment (e.g., Simulink® software, Stateflow® software, Sim Events® software, Simscape™ software, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from Telelogic; Ptolemy from the University of California at Berkeley; aspects of a Unified Modeling Language (UML) or SysML environment; etc.), or another type of programming environment, such as a hybrid programming environment that includes one or more text-based programming environments and one or more graphically-based programming environments.

The text-based programming environment may include a programming language (e.g., the MATLAB language) that may be used to express problems and/or solutions in mathematical notations. The programming language may allow a user to enter commands. The text-based programming language may be dynamically typed and/or array-based. In a dynamically typed array-based computing language, data may be contained in arrays and data types of the data may be determined (e.g., assigned) at program execution time. Consistent with this disclosure, the text-based programming environment may be utilized as a source code repository for interview question-and-answer data. Other types of source code and/or programming language may be contemplated. Consistent with this disclosure, computing device 102, cluster server 104, or historical solution data server 106 of system 100 (FIG. 1) may also operate as a programming environment in the same manner as depicted in computing device 300.

Figure 4:
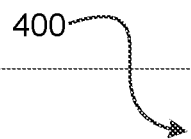
FIG. 4 depicts an exemplary graphic user interface (GUI) for presenting interview answer results, consistent with disclosed embodiments.
Figure 4:
Figure 4:
Figure 4:

FIG. 4 depicts an exemplary graphic user interface (GUI) 400 for presenting interview answer results to either an interviewer or interview candidate. Consistent with this disclosure, interview answer results may result from an automated preliminary check or a candidate answer to determine whether or not the syntax and/or format of source code is correct. Based on the interview answer results, the interviewer may need to spend additional time to further analyze answer source code to see if the logic of the source code is correct. FIG. 4 provides an exemplary GUI to provide such a preliminary graphical check for an interviewer. GUI 400 may be implemented in, for example, web browser application 116 of computing device 102. In some embodiments, FIG. 4 operates as a notification and transmission means for interview question and answer results to be communicated to one or more interviewers. As shown in FIG. 4, GUI 400 may include an icon and message 402 for indicating a "Correct Answer" and may include a request for a user to store the correct interview answer. As shown in FIG. 4, GUI 400 may also include a message 404 indicating an "Incorrect Answer" and a suggestion to discard an incorrect answer 404. In some embodiments, an interviewer may check GUI 400 to determine whether or not a candidate answer is correct prior to taking any subsequent action or performing a detailed evaluation of the source code set forth in the answer. In other embodiments, an interview candidate may check the interview answer result GUI 400 to determine whether or not his or her answer is correct prior to proceeding to the next question. In some embodiments, GUI 400 may reduce the time necessary for interviewers to analyze answer data by presenting results in a clean and neat display, and indicating whether further analysis of the answer data is justified. Other GUI elements (not shown) may be contemplated and included as part of GUI for use by either the interviewer or interview candidate as consistent with this disclosure.

Figure 5:
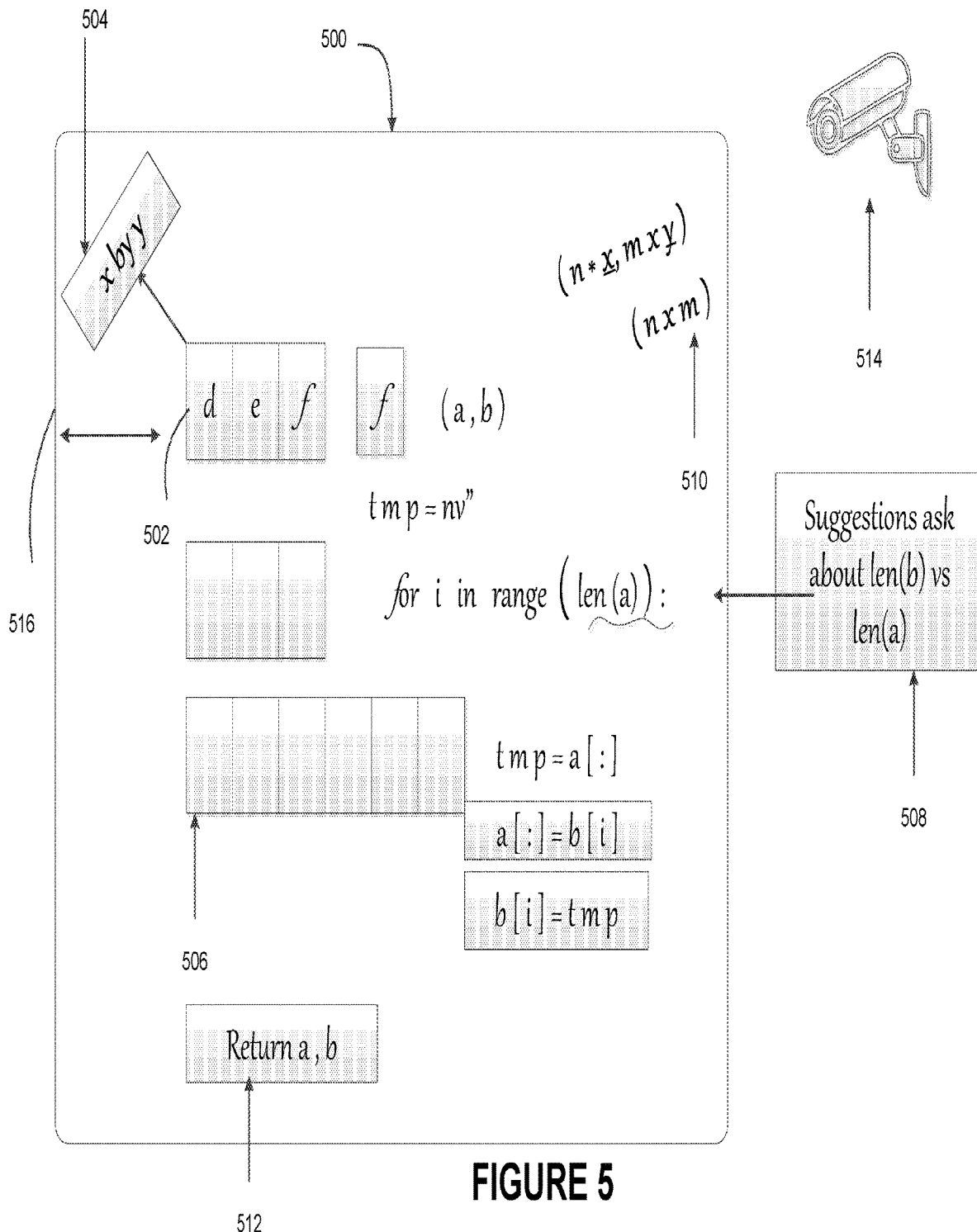
FIG. 5 is a schematic diagram of components for assisting an interviewer, consistent with disclosed embodiments.

FIG. 5 is a schematic diagram of a system 500 for assisting an interviewer in conducting a candidate interview. FIG. 5 includes a representation of a whiteboard 502 in which an interview candidate enters answers 504 to interview questions. As shown in FIG. 5, an imaging device 506 may be positioned in the interview room on the wall for capturing image data. The term "imaging device" may refer to a device capable of detecting and converting optical signals in the visible, near-infrared, infrared, and ultraviolet spectrums into electrical signals. The electrical signals may be used to form a still image or a video stream (i.e. image data) based on the detected signal. Imaging device 506 may include an image sensor (not shown) such as a semiconductor charge-coupled device (CCD), a complementary metal-oxide-semiconductors (CMOS) device, or an N-type metal-oxide-semiconductors (NMOS, Live MOS) device. Imaging device 506 may be implemented in computing device 102 (FIG. 1) or as a camera mounted on a wall of an interview room (as shown in FIG. 5).

In some embodiments, image analysis may be performed through the application of one or more image classification techniques after imaging device 506 captures image data. As an example, an image classification technique may be used to classify features of an image of whiteboard 502, such as lines of source code and alphanumeric characters of programming language, written on whiteboard 502 as answers 504 by a candidate during an interview. In some embodiments, an image classification technique may include one or more of image enhancement, edge detection, and data extraction. In other embodiments, image data may be classified by interview candidate, candidate source code answer, interview question type, programing language, interview time intervals, or other time periods. Specific examples of the methods for identifying source code in a captured image and for performing a classification of image data based on an image analysis technique are exemplary only, and a person of ordinary skill in the art will recognize other methods for identifying source code in an image that remain consistent with the present disclosure.

In FIG. 5 an edge of whiteboard 502 is captured as a first bounding box 508. Answers 504 include an alphanumeric character "d" entered in a second bounding box 510 as part of a source code answer. In some embodiments, an estimated distance measurement 512 from a side 514 of first bounding box 508 to a side 516 of second bounding box 510 may be obtained, based on a determined size in pixels of bounding boxes identified in the captured images. The distance measurement may also be obtained based on a position of alphanumeric characters in the captured images, and/or based on an estimation of the physical size of the source code, bounding box dimensions, and spacing or indentation of source code.

For example, if the size in pixels of the bounding boxes in the captured images is determined to be large or covering a large pixel area, a small distance between the bounding boxes may be estimated. Conversely, if the size in pixels of the bounding boxes or alphanumeric characters in the captured images is determined to be small or covering a small pixel area, a large distance between the bounding boxes or alphanumeric characters may be estimated. Alternatively, regardless of the size of bounding boxes, multiple distances between sides of bounding boxes may be estimated. Indeed, the distance measurement may be calculated or estimated in captured images in any suitable manner relating bounding boxes and alphanumeric characters, not limited to the examples herein, depending on implementation-specific considerations.

As shown in FIG. 5, first bounding box 508 may include answers 504 written by a candidate to an interview question (not shown). As an example, answers 504 may include multiple second bounding boxes containing alphanumeric characters such as "d," "e," and "f." The second bounding boxes exhibit height and width dimensions indicated by "x" and "y". Answers 504 may also include a plurality of empty bounding boxes 520 representative of empty spaces or tabs indicating indents of source code lines. As shown in FIG. 5, empty bounding boxes 520 may include 3 consecutive boxes or 6 consecutive boxes, representative of one or two indented tabs respectively. In some embodiments, as the number of indented tabs, or consecutive empty bounding boxes 506 increases, the greater the distance there is between side 514 of first bounding box 508 and side 516 of second bounding box 510. Consistent with this disclosure, multiple indented tabs may be indicative of source code correctly positioned with an algorithmic loop, and therefore, representative of a correct candidate answer. Conversely, in the absence of intended tabs, source code may be determined to be incorrectly positioned outside of an algorithmic loop, and therefore, representative of an incorrect candidate answer. Other distance and tab measurement techniques utilizing first, and second bounding boxes and alphanumeric characters may be contemplated. Imaging device 506 may interact with a processor of system 100 (FIG. 1) to calculate a distance or number of tabs and/or empty bounding boxes 520 from side 514 to side 516 of the first alphanumeric character on each line of candidate answers 504.

In some embodiments, answers 504 may also include a non-source code or text suggestion 526 written by the interviewer to "ask about lens(b) vs. lens(a)." The textual suggestion may suggest an improvement relative to the existing out source code. Suggestion 526 may also include a note for the interview candidate and not included as part of answer 500.

Answers 504 may further include a segment 522 of source code "n*x, m×y, n×m" positioned at an irregular indent and not along a horizontal line of source code. Answers 504 may also include exemplary source code including alphanumeric characters and variables "tmp=a [:], a [:]=b [i], b[i]=tm p" and "t m p=nv" and "for i in range (len (a)):." Finally, answers 504 may include exemplary source code 524 such as "Return a, b" indicating a close of an algorithmic loop. Other sample exemplary code types and programming languages may be included in answers 504.

Figure 6:
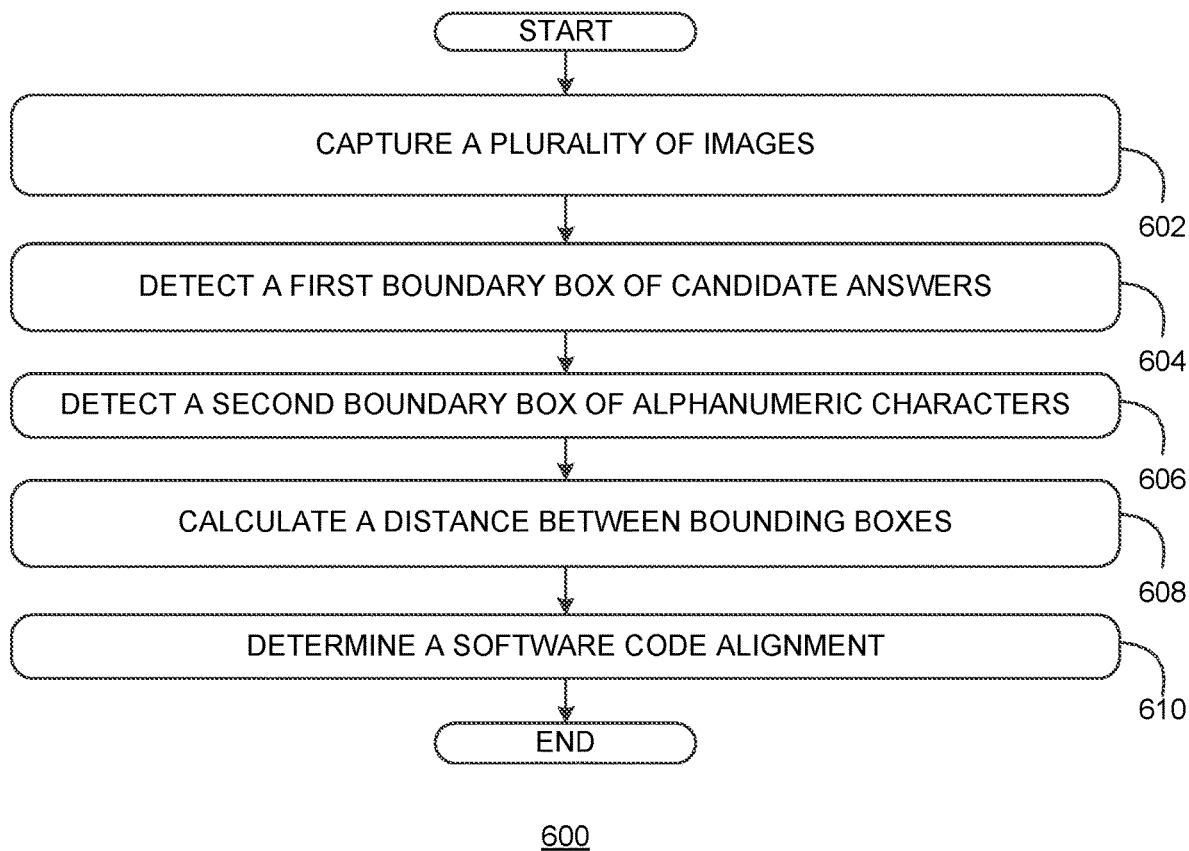
FIG. 6 depicts a flowchart of an exemplary process for determining candidate answers during an interview, consistent with disclosed embodiments.

FIG. 6 depicts a flowchart of an exemplary process for determining candidate answers during an interview, consistent with disclosed embodiments. In some embodiments, process 600 may be executed by system 100. For example, process 600 may be performed by any of computing device 102, cluster server 104, or historical solution data server 106.

At step 602, system 100, including any of computing device 102, cluster server 104, or historical solution data server 106, may capture, by imaging device 506, a plurality of images comprising a plurality of candidate answers 504. Electrical signals from imaging device 506 may be used to form an image or a video stream (i.e., image data) based on the detected signal. Image data may include any form of data retrieved from optical signals and, for example, may include the candidate answers handwritten on a white board. Consistent with this disclosure, image sensors may include semiconductor charge-coupled devices (CCD), active pixel sensors in complementary metal-oxide-semiconductors (CMOS), or N-type metal-oxide-semiconductors (NMOS, Live MOS). In some cases, imaging device 506 may be implemented as one or more cameras integral to a computing device 102. System 100, may then perform an image classification technique based on features of answer 504 within the captured images.

At step 604, system 100 may detect, based on the images, a first bounding box of the plurality of the candidate answers 504. In some embodiments, detection may be based on one or more image enhancement, edge detection, identifying pixels or a pixel area, and/or data extraction from a plurality of images. Candidate answers 504 may include any type of programming language, alphanumeric characters, or source code. For example, the interview candidate may be required to provide an answer of source code in a conventional programming language, such as C++, C, Fortran, Pascal, etc. In some implementations, the interview question may require a programming language that supports dynamic typing (e.g., the M language, a MATLAB® language, a MATLAB-compatible language, a MATLAB-like language, Julia, Python, etc.) that can be used to express problems and/or solutions in mathematical notations. Other types of programming languages for candidate answers 504 received within a first bounding box may be contemplated.

At step 606, system 100 may detect a second bounding box including a plurality of alphanumeric characters. System 100 may then determine an average size of the second bounding box, based on height and width dimensions. As shown in FIG. 5, a second bounding box that may include one or a plurality of alphanumeric characters including within the second bounding box and may be positioned at one or more indentations based on a plurality of empty bounding boxes At step 608, system 100 may calculate a distance or number of tabs and/or empty bounding boxes from the side of the first bounding box to the side of a bounding box containing the first alphanumeric character on lines of the candidate answers. The distance may be measured in number of pixels, number of empty bounding boxes, or number of tabs. In some embodiments, system 100 may calculate a distance from a side of a first bounding box to a side of a second bounding box, wherein the second bounding box encloses a first alphanumeric character located on a line of source code. Other distance measurement methodologies may be contemplated as discussed above.

At step 610, system 100 may determine, based on the calculated distance, a source code alignment. The source code alignment may include a level of indentation for the candidate answer. The level of indentation may include a quantity or a number of tabs. System 100 may also automatically detect source code alignment or a quantity of a number of tabs across a plurality of lines of the source code. System 100 may further compare the source code alignment of a plurality of candidate answers to the source code alignment of a plurality of candidate solutions previously stored in a database. The database may store all accepted solutions from many interviews before the system detects any bugs, incorrect alphanumeric characters, or improper source code alignment in the code. System 100 may further detect if there is a bug in the extracted code, and inform, based on the detection, interviewers to ask new questions to the interview candidates. System 100 (FIG. 1) may also suggest questions for the interviewers to ask based on a plurality of stored candidate solutions and based on the determined source code alignment.

Another aspect of the disclosure is directed to a non-transitory computer-readable medium storing instructions that, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon. Stored on any one or on a combination of solid, tangible computer readable media, disclosed embodiments may include instructions programmed according to the disclosed teachings for controlling the devices and subsystems of embodiments, for driving the devices and subsystems of embodiments, and for enabling the devices and subsystems of embodiments to interact with a user. Such software may include, but is not limited to, device drivers, firmware, operating systems, development tools, applications software, and the like. Software implementing exemplary embodiments may include any suitable interpretable or executable code mechanism, including but not limited to scripts, interpretable programs, and a variety of programming languages, such as Java, C, C++, JavaScript, or any other now known or later created programming language.

Program instructions stored on a computer readable storage medium may include assembler instructions, machine dependent instructions, firmware instructions, source code or object code written in any combination of one or more programming languages, including an object oriented programming languages, procedural programming languages or functional programming languages. The programming language may be Fortran, Lisp, C++ or the like. The program instructions may be executed by a processor of the interaction system. In some embodiments, the program instructions may be executed by a processor of the user device, and in some embodiments, both the user device processor and the processor of the interaction system may execute program instructions.

It will be apparent to those skilled in the art that various modifications and variations can be made to the disclosed system and related methods. Other embodiments will be apparent to those skilled in the art from consideration of the specification and practice of the disclosed system and related methods. It is intended that the specification and examples be considered as exemplary only, with a true scope being indicated by the following claims and their equivalents.

What is claimed is:

1. A system comprising:
a memory; and
a processor in communication with the memory, wherein the processor is configured to:
cause an image sensor to capture a plurality of images;
detect, based on the plurality of images, a first bounding box comprising a plurality of text characters;
detect, based on the plurality of images, a second bounding box comprising a plurality of alphanumeric characters;
calculate a distance from a side of the first bounding box to a side of the second bounding box; and
determine, based on the calculated distance, a software code alignment.

2. The system of claim 1, wherein a first one of the plurality of alphanumeric characters is located on a line of software code.

3. The system of claim 2, wherein the software code alignment comprises an indentation in the software code.

4. The system of claim 3, wherein:
the indentation comprises a plurality of tabs; and
the plurality of tabs are indicative of software code within an algorithmic loop.

5. The system of claim 2, wherein the processor is further configured to:
detect if an error exists in the software code; and
based on the detection, prompt interviewers to provide interview questions.

6. The system of claim 1, wherein the image sensor comprises a camera positioned on a wall in a room.

7. The system of claim 1, wherein:
the second bounding box comprises a height dimension and a width dimension; and
the processor is further configured to calculate an average size of the second bounding box, based on the height and width dimensions.

8. The system of claim 1, wherein determining a software code alignment comprises automatically detecting a software code alignment across a plurality of lines of the software code.

9. The system of claim 1, wherein the processor is further configured to:
compare the plurality of text characters to a plurality of candidate solutions stored in a database,
the plurality of candidate solutions comprising candidate solutions based on a plurality of interviews.

10. A method comprising:
causing, by a processor, an image sensor to capture a plurality of images;
detecting, by the processor based on the plurality of images, a first bounding box comprising a plurality of text characters;
detecting, by the processor based on the plurality of images, a second bounding box comprising a plurality of alphanumeric characters;
calculating, by the processor, a distance from a side of the first bounding box to a side of the second bounding box; and
determining, by the processor based on the calculated distance, a software code alignment.

11. The method of claim 10, wherein:
the software code alignment comprises an indentation in a software code; and
the indentation comprises a plurality of tabs.

12. The method of claim 10, further comprising:
determining, by the processor, whether the software code alignment comprises a tab, wherein an absence of the tab indicates software code placed outside of an algorithmic loop.

13. The method of claim 12, wherein software code placed outside of an algorithmic loop indicates an incorrect candidate answer.

14. The method of claim 10, further comprising:
detecting, by the processor, if an error exists in a software code; and
based on the detection, suggesting, by the processor, questions for interviewers to ask based on a plurality of stored candidate solutions.

15. The method of claim 14, wherein the stored candidate solutions comprise candidate solutions based on a plurality of interviews.

16. The method of claim 10, wherein the image sensor comprises a camera positioned on a laptop.

17. A non-transitory computer-readable medium storing instructions that, when executed by a processor, cause the processor to perform operations comprising:
causing an image sensor to capture a plurality of images;
detecting, based on the plurality of images, a first bounding box comprising a plurality of text characters;

detecting, based on the plurality of images, a second bounding box comprising a plurality of alphanumeric characters;

calculating a distance from a side of the first bounding box to a side of the second bounding box; and determining, based on the calculated distance, a software code alignment.

18. The non-transitory computer-readable medium of claim 17, wherein:

the software code alignment comprises an indentation, and the indentation is indicative of software code within an algorithmic loop.

19. The non-transitory computer-readable medium of claim 17, wherein the operations further comprise:

detecting if an error exists in the software code, and based on the detection, suggesting questions for interviewers to ask based on a plurality of stored candidate solutions.

20. The non-transitory computer-readable medium of claim 17, wherein:

the second bounding box comprises a height dimension and a width dimension, and the operations further comprise calculating an average size of the second bounding box based on the height and width dimensions.

\* \* \* \* \*